(12) United States Patent
Saarem

(10) Patent No.: US 6,739,598 B1
(45) Date of Patent: May 25, 2004

(54) SEAL BETWEEN A CONDUIT AND CABLE

(75) Inventor: Myrl J. Saarem, Carson City, NV (US)

(73) Assignee: Arlen K. Bean, Reno, NV (US)

( * ) Notice: Subject to any disclaimer, the term of this patent is extended or adjusted under 35 U.S.C. 154(b) by 0 days.

(21) Appl. No.: 10/321,015

(22) Filed: Dec. 18, 2002

(51) Int. Cl.$^7$ ............................................. F16L 17/00
(52) U.S. Cl. ...................... 277/616; 277/602; 385/136
(58) Field of Search ..................... 385/136; 174/70 R; 277/616, 602, 603, 606

(56) References Cited

U.S. PATENT DOCUMENTS

| | | | | |
|---|---|---|---|---|
| 2,922,836 A | * | 1/1960 | Brown ........................ 277/606 |
| 3,654,382 A | * | 4/1972 | Rubright ................. 174/153 G |
| 4,354,731 A | * | 10/1982 | Mouissie ..................... 385/72 |
| 4,679,895 A | * | 7/1987 | Huber .......................... 385/87 |
| 4,733,934 A | * | 3/1988 | Wais et al. .................... 385/89 |
| 4,743,088 A | * | 5/1988 | Balyasny et al. .............. 385/76 |
| 4,842,364 A | | 6/1989 | Chen |
| 5,283,853 A | * | 2/1994 | Szegda ........................ 385/139 |
| 5,331,114 A | * | 7/1994 | Rudolph ....................... 174/93 |
| 5,371,821 A | * | 12/1994 | Szegda ......................... 385/87 |
| 5,598,500 A | * | 1/1997 | Crespel et al. .............. 385/139 |

* cited by examiner

Primary Examiner—William L. Miller

(57) ABSTRACT

A seal is provided to seal the area between a cable containing optic fibers and the terminal end of a conduit through which the cable runs. The seal consists of a resilient gasket and a supporting structure and a cam. The seal assembly, encompassing the cable, is inserted into the terminal end of a conduit that houses the cable. Actuation of a cam compresses a gasket into sealing contact with the cable and with the conduit, thereby sealing the terminal end of the conduit from entry of contaminants.

10 Claims, 4 Drawing Sheets

| 12A | 12B | 12C | 12D | 12E |

SEAL BETWEEN A CONDUIT AND CABLE

BACKGROUND—FIELD OF THE IVENTION

This invention relates to sealing the area between a terminated conduit and a cable that egresses therefrom.

BACKGROUND—PRIOR ART

Fiber optic cables have become a preferred transmission system for telecommunication and data communication. A cable can contain many strands of optic fibers. These cables are generally installed underground inside a conduit. The conduit and the cable that runs through it are often laid in trenches and can extend for long distances. For purposes of maintenance, upgrading, and connection to the fiber optics, underground vaults are installed strategically along the path of the conduit and cable. Many cables and conduits may terminate or run through these vaults or other similar compartments. When a conduit terminates, but the cable continues its run, it is desirable to provide a seal between the cable and the conduit at the termination of the conduit. This seal prevents contaminants from entering the space between the cable and the conduit and thereby avoids possible deterioration of the fiber optic cable and its contents.

Schemes to effect this seal are easily provided if both the conduit and cable terminate in close proximity of each other. In this case, the seal is formed by a gasket and supporting structure. The gasket and its supports can slide axially over the cable and into the conduit. This is not the case if the end of the cable is not accessible. In this case the gasket and its supports must be split or halved in order to surround the cable. Such a seal is described in U.S. Pat. No. 4,842,364. The device described requires intricate fabrication techniques that utilize split threaded devices used for producing compression force on a gasket, thus causing the gasket to expand. The threaded nut is made in two halves and must be assembled around the cable. During fabrication of this nut, significant effort must be given to the correct timing of the threads so that when assembled the mating halves will produce a continuous thread. Assembly of the split halves can be difficult. In this prior art, the majority of the assembly of the seal occurs at the installation site, in the confines of an underground vault, which is difficult because the pieces are small and intricate. If the threaded parts are made of plastic, the tooling to produce these parts is intricate, complicated, and expensive. The amount of compression of the gasket in this and other prior art is dependent on how tightly threaded members are torqued. Since this torque is uncontrolled, large forces may be transmitted which may damage the conduit and/or cable. Conversely, if too little torque is applied, the gasket may not seal as intended. Some prior art use metal fasteners as part of the scheme to compress a gasket. Metal may corrode after time.

SUMMARY OF THE INVENTION

Accordingly, it is the object of this invention to provide a simple, cost effective means to seal the area around a cable and the conduit in which the cable resides. The advantages are:

(a) extreme ease of installation
(b) low cost
(c) complete assembly ease prior to installation
(d) controlled force that is transmitted to the cable and conduit
(e) excellent sealing between cable and conduit
(f) resistance to chemicals in its environment
(g) inherent corrosion resistance Still further objectives and advantages will become apparent from a consideration of the ensuing description.

In accordance with the present invention the seal between the cable and the conduit is effected when a gasket is compressed or expanded by the simple means of rotating a cam member into a locked position.

REFERENCE NUMERALS IN DRAWINGS

| 10 Lug Half | 12 Flange | 14 Arm |
|---|---|---|
| 16 Hole | 20 Bearing Half | 22 Body |
| 24 Flange | 26 Ring | 28 Slot |
| 30 Gasket | 32 Slot | 34 Slit |
| 40 Cam | 42 Arm | 44 Handle |
| 46 Boss | 48 Cam Surface | 50 Cable |
| 52 Conduit | 54 Ledge | 60 Seal Assembly |
| 70 Inner Gasket | 72 Outer Gasket | 80 Lug Half |
| 82 Shroud | 84 Arm | 90 Bearing Half |
| 92 Recess | 94 Slot | 96 Flange |
| 100 Seal Assembly | 110 Incline | |

DETAILED DESCRIPTION OF THE INVENTION

Figure 1:
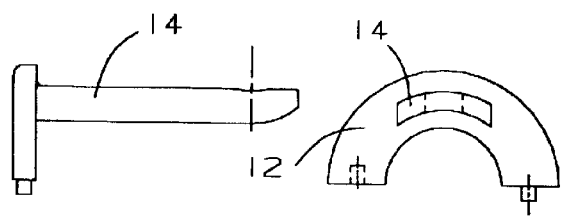
FIG. 1 shows three orthogonal views of a lug half.

In the first preferred embodiment, lug half 10, as shown in FIG. 1, has a semicircular annular flange 12 from which extends a centrally located arm 14 of abbreviated annular shape. Near the end of the arm 14 opposite the flange 12 is a centrally located hole 16.

Figure 2:
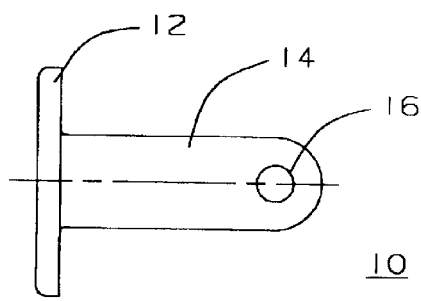
FIG. 2 shows two orthogonal views of a bearing half.
Figure 2:
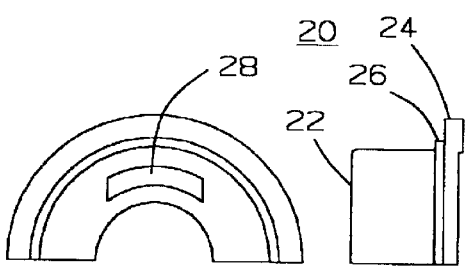

Bearing half 20, as shown in FIG. 2 has an semicircular annular body 22 with a flange 24 at one end. A small semicircular annular integral ring 26 is located at the intersection of the body 22 and the flange 24. A slot 28 is centrally located in the body 22 that is of size to accept arm 14 of lug half 10.

Figure 3:
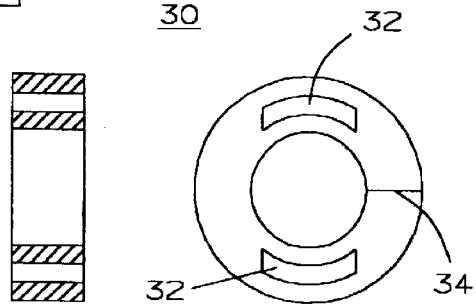
FIG. 3 shows two orthogonal views of a gasket.
Figure 4:
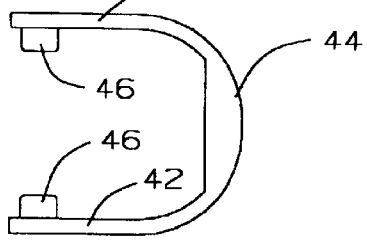
FIG. 4 shows two orthogonal views of a cam.

Gasket 30 shown in FIG. 3 is tubular with two slots 32 diametrically opposed in position to accept arms 14 of lug halves 10. At approximately the midpoint between the two slots 32, gasket 30 is slit 34. Gasket 30 is made of resilient material.

Figure 5:
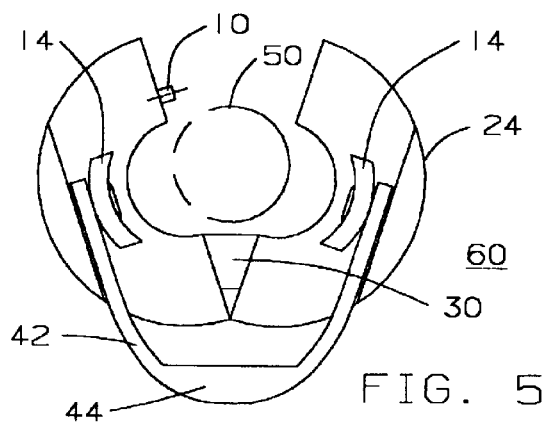
FIG. 5 shows a end view of a completed seal assembly spread apart so as to fit over a cable.

Cam 40, as shown in FIG. 5, has two flexible arms 42 joined by a handle 44. Flexible arms 42 have generally cylindrical bosses 46 for engagement with holes 16 in lug halves 10. Cam surface 48 will bear against flange 24 of bearing half 20 when assembled as will be shown.

To form the seal assembly 60, slots 32 of gasket 30 are slid over arms 14 of two lug halves 10 until gasket 30 abuts flange 12. Two bearing halves 20 are then slid over the extending arms 14 through slots 28. Arms 14 now extend sufficiently through bearing halves 20 so that cam 40 can be installed. Seal assembly 60 is completed when cam 40 is joined to lug halves 10 by spreading flexible arms 42 and placing bosses 46 into exposed holes 16 in arms 14.

The entire seal assembly 60 can now be spread, as shown in FIG. 5, sufficiently to encompass cable 50.

Figure 6:
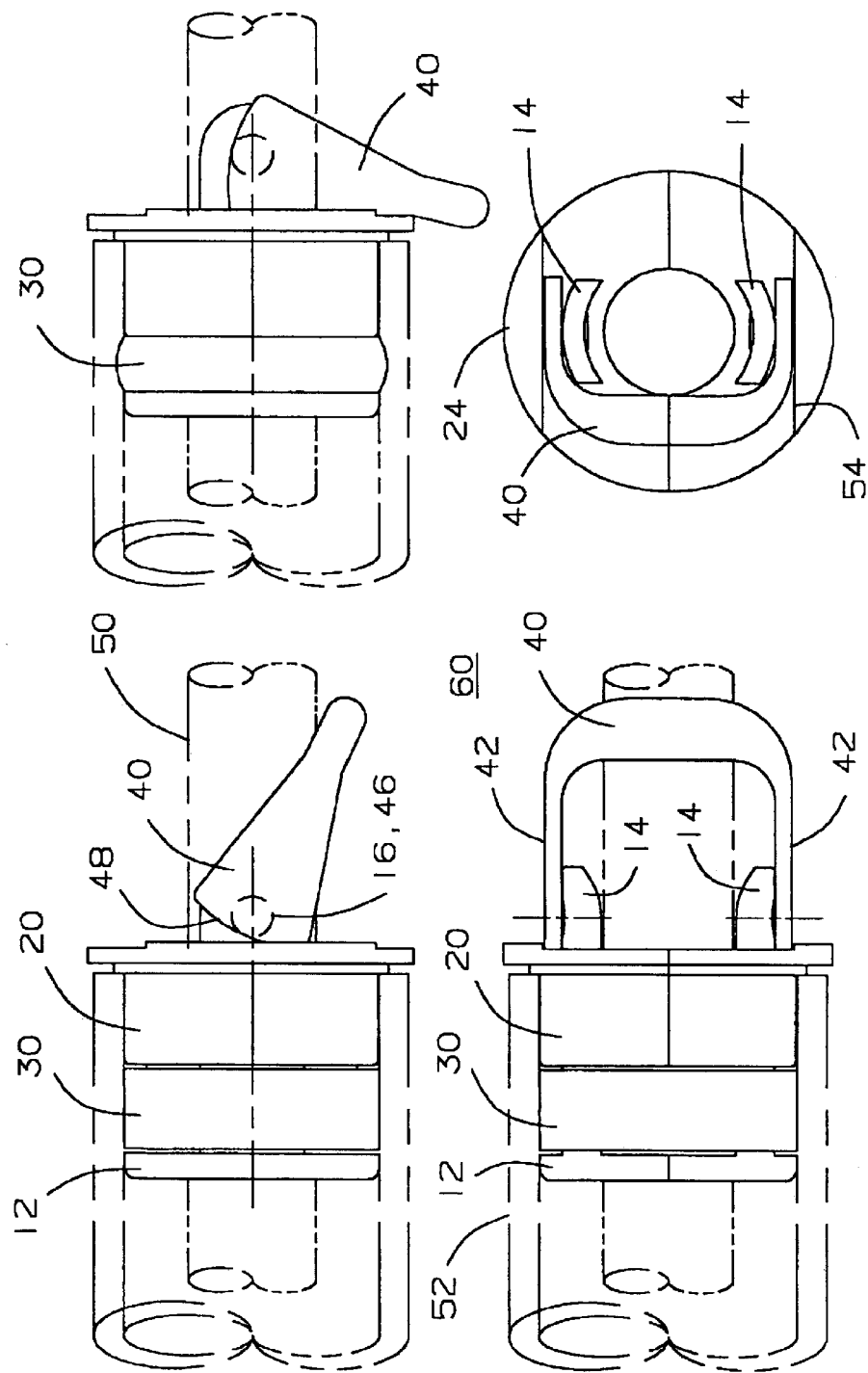
FIG. 6 shows three orthogonal views of the assembly of the invention installed over a cable and into a conduit with a cam in a relaxed position and an additional view showing the cam in an actuated position.

As shown in FIG. 6 seal assembly 60 is now ready to slide over cable 50 and into conduit 52 until ring 26 abuts the end of conduit 52. Ring 26 is provided to space flange 24 away from conduit 52 to permit easy grasping of flange 24 to facilitate removal of seal assembly 60. Seal assembly 60 is locked in place when the cam 40 is rotated to the position shown in the upper right hand view of FIG. 6. At this point gasket 30 is compressed and the outside diameter is increased and inside diameter is decreased sufficiently to make a appropriate seal between cable 50 and conduit 52.

Ledge 54 is provided on flange 24 to capture cam surface 48 and prevent any forces from causing bosses 46 from leaving holes 16.

Thus lug halves 10 and bearing halves 20 provide a supporting structure for gasket 30 which is expanded into sealing contact with the conduit and cable when cam 40 is actuated.

Figures 9, 10:
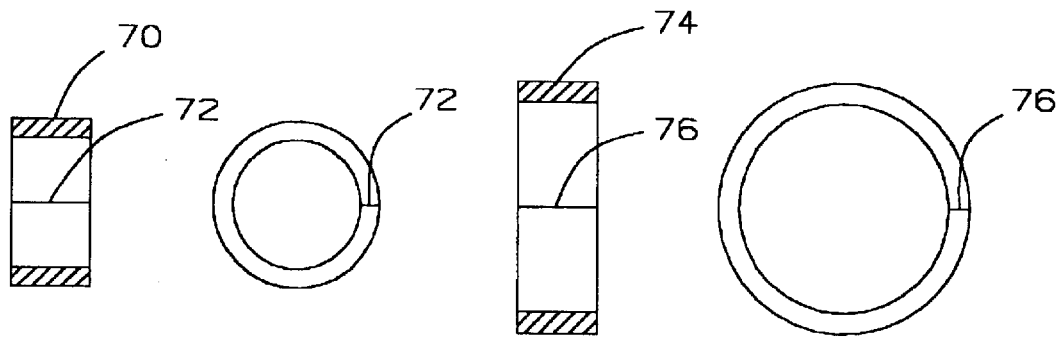
FIG. 9 shows two orthogonal views of an inside gasket in a second embodiment.
FIG. 10 shows two orthogonal views of an outside gasket in a second embodiment.
Figure 11:
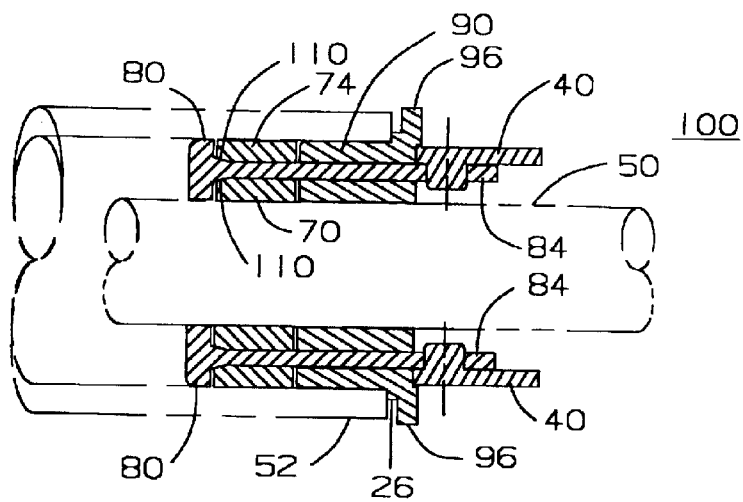
FIG. 11 shows a cross-section of a seal with inclines that urge gaskets into engagement with the cable and conduit.

In the second embodiment (FIG. 11), two separate gaskets are used in seal assembly 100. Inner gasket 70 is shown in FIG. 9 with slit 72 and outer gasket 74 is shown in FIG. 10 with slit 76. In FIG. 11 inner gasket 70 is wrapped around the cable 50.

Figure 7:
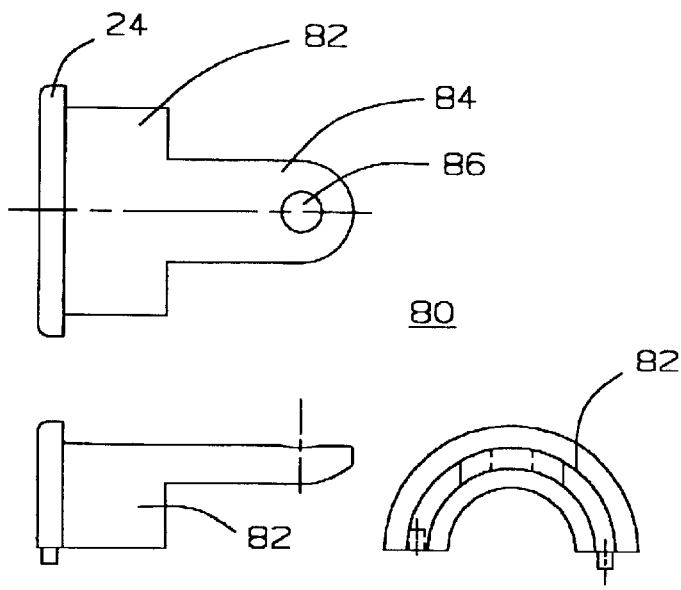
FIG. 7 shows three orthogonal views of a lug half in a second embodiment.
Figure 8:
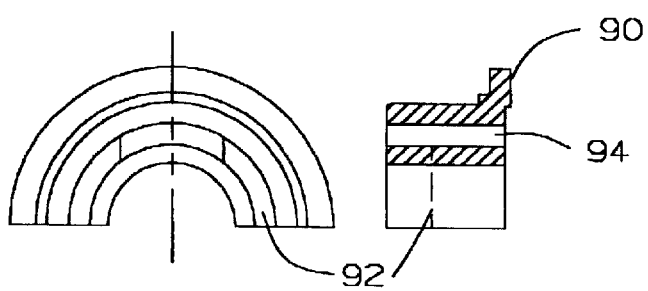
FIG. 8 shows two orthogonal views of a bearing half in a second embodiment.

Two lug halves 80 are placed diametrically opposed over the gasket 70 so that shroud 82 (FIG. 7) covers gasket 70. Outer gasket 74 is then wrapped around shroud 82 adjacent to flange 96. Bearing halves 90 have a recess 92 (FIG. 8) to accept the shroud 82. Arms 84 fit through the slots 94. Cam 40 is installed the same as in the first preferred embodiment. When cam 40 is rotated to its locked position both inner gasket 70 and outer gasket 74 are compressed. This causes sealing to occur between cable 50 and shroud 82, and between shroud 82 and conduit 52. Inclines 110 may be added to lug halves 80 to augment sealing.

Figure 12:
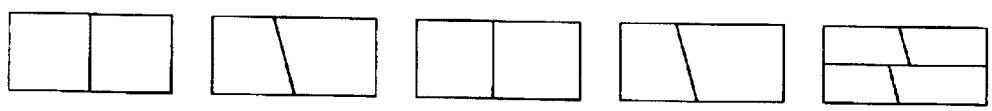
FIGS. 12A, B, C, D and E show different slits of typical gaskets.
Figure 12:
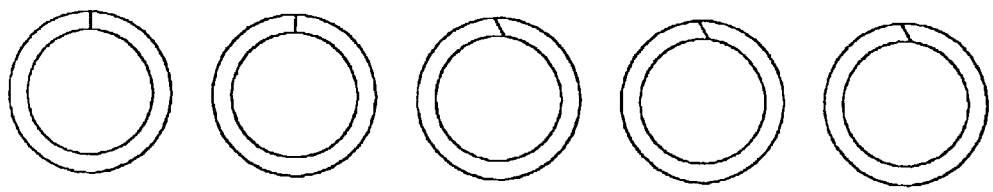

FIG. 12A through D show several methods of slitting gaskets 30, 70 and 72. FIG. 12A shows a radial and axial on centerline slit. FIG. 12B shows a radial but axially angled slit. FIG. 12C shows a slit angled with a radius and axially on centerline. FIG. 12D shows a slit at an angle with a radius and also at an angle with axial centerline. Yet another version of gaskets 30, 70 and 72 is shown in FIG. 12E. In this version the gasket 30, 70 and 72 are split into two pieces axially as well as being slit in any of schemes shown in FIGS. 12A, B, C and D. These different techniques of slitting can have advantages in effectiveness of sealing by creating a more torturous path for leakage. These gaskets are made of resilient material such as synthetic rubber. Another material of preference for these gaskets is closed cell, low compression set, foam rubber. Synthetic rubber materials, when totally contained, act as incompressible fluids when under compressive loading. Closed cell foam, with its air filled cells, avoids this phenomenon, and acts as a compressible material.

CONCLUSIONS

Therefore, it can be seen from the foregoing specification, that this invention provides a unique seal between a terminated conduit end and the cable that runs through it.

The seal is extremely cost effective. For example, both lug halves are identical which reduces the manufacturing costs. The same is true for the bearing halves. The supporting parts can be made using inexpensive plastic material. The gasket (s) can be made by molding, extrusion or die-cut processes allowing a variety of manufacturing techniques.

The seal is easily assembled and easily installed. The first preferred embodiment requires no assembly at the installation site, which is not the case with prior art. The gasket compression is positive and mechanically limited. This controls the compression of the gasket(s) and consequently the force transmitted to the cable and the conduit. The seal accommodates variations in the diameter of the cable and the conduit while still providing an excellent seal.

Materials can be selected that provide excellent corrosion resistance and environmental compatibility.

It will be appreciated that while particular embodiments of the invention have been shown and described, modifications may be made. It is intended in the claims to cover all modification which come within the true spirit and scope of the invention.

I claim:

1. A sealing means for sealing the area between a terminal end of a conduit and a cable that runs through it, comprising:

a) a slit gasket, and b) a halved supporting structure, and c) a camming means with flexible arms, whereby actuation of said camming means with flexible arms causes said halved supporting structure to cause said slit gasket to seal the area between said terminal end of said conduit and said cable.

2. The sealing means of claim 1, wherein said split gasket, said halved supporting structure, and said camming means with flexible arms, when assembled, can be sufficiently spread apart to encompass said cable.

3. The sealing means of claim 1, wherein said slit gasket is resilient.

4. The sealing means of claim 1, wherein said slit gasket is made of foam rubber.

5. The sealing means of claim 1, wherein said supporting structure comprises:

a) two lug halves and, b) two bearing halves, wherein said two lug halves are identical and said two bearing halves are identical.

6. The sealing means of claim 1, wherein said supporting structure is constructed of plastic material resistant to corrosion and chemicals.

7. A sealing means for sealing the area between a terminal end of a conduit and a cable that runs through it, comprising:

a) a slit inner gasket, and b) a slit outer gasket, and c) a halved supporting structure, and d) a cam, whereby actuation of said cam causes said halved supporting structure to cause said slit inner gasket to seal the area between said support structure and said cable, and to cause said outer gasket to seal the area between said supporting structure and said terminal end of said conduit.

8. The sealing means of claim 7 wherein said inner gasket and said outer gasket are made of resilient material.

9. The sealing means of claim 7 wherein said inner gasket and said outer gasket are made of foam rubber.

10. The sealing means of claim 7 wherein said supporting structure is constructed of plastic material resistant to corrosion and chemicals.

* * * * *